(12) United States Patent
El-Keyi et al.

(10) Patent No.: US 12,719,535 B2
(45) Date of Patent: Aug. 25, 2026

(54) ADAPTIVE UPLINK SU-MIMO PRECODING IN WIRELESS CELLULAR SYSTEMS BASED ON RECEPTION QUALITY MEASUREMENTS

(71) Applicant: Telefonaktiebolaget LM Ericsson (publ), Stockholm (SE)

(72) Inventors: Amr El-Keyi, Kanata (CA); Chandra Bontu, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 736 days.

(21) Appl. No.: 17/920,190

(22) PCT Filed: May 11, 2020

(86) PCT No.: PCT/IB2020/054446
§ 371 (c)(1),
(2) Date: Oct. 20, 2022

(87) PCT Pub. No.: WO2021/229264
PCT Pub. Date: Nov. 18, 2021

(65) Prior Publication Data
US 2023/0163820 A1 May 25, 2023

(51) Int. Cl.
*H04B 7/0456* (2017.01)
*H04B 7/06* (2006.01)

(52) U.S. Cl.
CPC .......... *H04B 7/0482* (2013.01); *H04B 7/063* (2013.01)

(58) Field of Classification Search
CPC .. H04B 7/0413; H04B 7/0456; H04B 7/0482; H04B 7/0486; H04B 7/06; H04B 7/0613; H04B 7/0621; H04B 7/063; H04B 7/0695
See application file for complete search history.

(56) References Cited

U.S. PATENT DOCUMENTS 9,496,935 B1 * 11/2016 Kwon ................ H04L 27/0008
2017/0201300 A1 7/2017 Parkvall et al.
(Continued)

FOREIGN PATENT DOCUMENTS

WO 2019/047972 A1 3/2019

OTHER PUBLICATIONS

International Search Report and Written Opinion dated Feb. 9, 2021 issued in PCT Application No. PCT/IB2020/054446, consisting of 18 pages.

(Continued)

*Primary Examiner* — Paul H. Masur
(74) *Attorney, Agent, or Firm* — Sonoda & Kobayashi Intellectual Property Law; Sarvajit S. Patil

(57) ABSTRACT

A network node is configured to: cause transmission of signaling of uplink grants indicating a first exploration set of precoders for a first plurality of uplink transmissions where each precoder of the first exploration set of precoders is associated with an uplink transmission of the first plurality of uplink transmissions; determine a first plurality of reception quality metrics associated with the first plurality of uplink transmissions; determine a first precoder of the first exploration set of precoders based on the first plurality of reception quality metrics; select the first precoder of the first exploration set of precoders for uplink transmission based on the first precoder meeting a predefined exploitation selection criterion; and form a second exploration set of precoders to be associated with a second plurality of uplink transmissions based on the first precoder failing to meet the predefined exploitation selection criterion.

16 Claims, 10 Drawing Sheets

(56) References Cited

U.S. PATENT DOCUMENTS

| | | | | |
|---|---|---|---|---|
| 2018/0367205 | A1* | 12/2018 | Liu | H04B 7/0486 |
| 2020/0007203 | A1* | 1/2020 | Zhou | H04B 7/0617 |
| 2021/0281373 | A1* | 9/2021 | Liu | H04B 7/0413 |
| 2021/0336667 | A1* | 10/2021 | Bengtsson | H04B 7/0469 |
| 2022/0374685 | A1* | 11/2022 | Lee | G06N 3/08 |
| 2022/0393729 | A1* | 12/2022 | Lee | G06N 3/092 |
| 2023/0084239 | A1* | 3/2023 | Cha | H04W 52/241<br>455/522 |

OTHER PUBLICATIONS

3GPP TS 38.211 V15.5.0 (Mar. 2019); 3rd Generation Partnership Project; Technical Specification Group Radio Access Network; NR; Physical Channels and Modulation (Release 15), consisting of 96 pages.

* cited by examiner

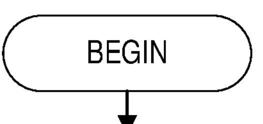

Cause transmission of signaling of one or more uplink grants indicating an first exploration set of precoders for a first plurality of uplink transmissions, each precoder of the first exploration set of precoders being associated with an uplink transmission of the first plurality of uplink transmissions
S136

Determine a first plurality of reception quality metrics associated with the first plurality of uplink transmissions
S138

Determine a first precoder of the first exploration set of precoders based at least in part on the first plurality of reception quality metrics
S140

Select the first precoder of the first exploration set of precoders for uplink transmission based at least on the first precoder meeting a predefined exploitation selection criterion
S142

Form a second exploration set of precoders to be associated with a second plurality of uplink transmissions based at least on the first precoder failing to meet the predefined exploitation selection criterion
S144

END

FIG. 7

ADAPTIVE UPLINK SU-MIMO PRECODING IN WIRELESS CELLULAR SYSTEMS BASED ON RECEPTION QUALITY MEASUREMENTS

CROSS-REFERENCE TO RELATED APPLICATIONS

This application is a Submission Under 35 U.S.C. § 371 for U.S. National Stage Patent Application of International Application Number: PCT/IB2020/054446, filed May 11, 2020 entitled "ADAPTIVE UPLINK SU-MIMO PRECODING IN WIRELESS CELLULAR SYSTEMS BASED ON RECEPTION QUALITY MEASUREMENTS," the entirety of which is incorporated herein by reference.

TECHNICAL FIELD

Wireless communication and in particular, codebook-based precoder selection based on information provided from previous uplink receptions.

BACKGROUND

Spatial multiplexing can provide capacity improvements to wireless cellular systems by transmitting multiple spatial layers (data streams) on the same time-frequency resources. In single user multiple input multiple output (SU-MIMO) transmission, multiple spatial layers are scheduled simultaneously to a single wireless device. These layers are spatially multiplexed by mapping the transmitted layers to the available transmit antennas of the network node using a precoder. Some existing network products for 3rd Generation Partnership Project (3GPP) fourth generation (4G) (also referred to a Long Term Evolution (LTE)) and fifth generation (5G)(also referred to as new radio (NR)) support only single layer transmission with fixed omni-directional transmission in the uplink. Further, in 5G systems, uplink SU-MIMO can be implemented via codebook-based precoding where the uplink precoding matrix is selected from a finite set of available precoders. The uplink precoder is selected by the network node and signaled to the wireless device in the uplink grant.

Several methods have been proposed for selecting the uplink precoding matrix for SU-MIMO transmission. These existing methods rely on the network node collecting information about the uplink channel state and processing this information to determine the number of uplink layers and uplink precoding matrix. For example, precoding selection may be performed using the second-order statistics of the channel where the channel statistics were obtained from uplink sounding reference signals that are periodically transmitted from the wireless device. This example requires allocating dedicated sounding resources to the wireless devices in the uplink to enable continuous tracking of the second-order statistics of the channel.

On the other hand, in another example, the channel statistics were continuously tracked using the uplink demodulation reference symbols (DMRS). Since the DMRS transmissions are precoded, direct estimation of the uplink channel statistics from every uplink transmission is not possible. Hence, a switching mechanism was proposed to switch between an exploration mode where precoder selection is performed to improve current channel estimates and an exploitation mode where the uplink precoder is selected to maximize the throughput gain using the current channel estimates.

However, these existing methods for uplink SU-MIMO precoding selection rely on collecting information on the instantaneous uplink channel or the uplink channel's second-order statistics to select the number of layers and the precoding matrix. Since this information is obtained from uplink sounding reference signals or via processing the uplink DMRS, the computational complexity and memory requirements of these uplink precoding selection algorithms can be very high, especially when many wireless devices are simultaneously active and/or the uplink bandwidth is relatively large. Furthermore, these algorithms may be sensitive to modelling and estimation errors in the uplink channel.

SUMMARY

Some embodiments advantageously provide a method, network node and system for codebook-based precoder selection based on information provided from previous uplink receptions.

In one or more embodiments, a system and method for uplink SU-MIMO codebook-based precoding selection in wireless systems, e.g., LTE and NR, is provided. The system such as the network node selects the number of uplink layers (e.g., spatial layers (data streams)) and the uplink precoder such that the information carrying capacity of the uplink is maximized. The system may not require estimation of the uplink channel or its statistics as may be performed in existing systems. Instead, the system selects the uplink precoder using the information obtained from previous uplink receptions (e.g., previously received uplink data streams). This is achieved by switching between exploration mode/phase, where uplink transmissions are scheduled to provide information about dominant spatial channel directions, and exploitation mode/phase, where the uplink transmissions are selected in the best spatial channel directions known so far. The precoders used in exploration mode, i.e., during the exploration phase, are determined adaptively based on the precoder used during the previous exploitation phase. Furthermore, the duration of the exploitation phase is selected based on the wireless device mobility and the performance loss during the last exploration phase. Simulation results indicate that the algorithms described herein can provide a significant performance improvement in the uplink cell throughput compared to 1-layer transmission and that the degradation in cell throughput relative to optimal uplink precoding selection that utilizes full channel information is less than 5%.

According to one aspect of the disclosure, a network node configured to communicate with a wireless device is provided. The network node includes processing circuitry configured to: cause transmission of signaling of one or more uplink grants indicating a first exploration set of precoders for a first plurality of uplink transmissions where each precoder of the first exploration set of precoders is associated with an uplink transmission of the first plurality of uplink transmissions; determine a first plurality of reception quality metrics associated with the first plurality of uplink transmissions; determine a first precoder of the first exploration set of precoders based at least in part on the first plurality of reception quality metrics; select the first precoder of the first exploration set of precoders for uplink transmission based at least on the first precoder meeting a predefined exploitation selection criterion; and form a second exploration set of precoders to be associated with a second plurality of uplink transmissions based at least on the first precoder failing to meet the predefined exploitation selection criterion.

According to one or more embodiments of this aspect, each one of the first exploration set of precoders is one of equal in rank to a second precoder of the first exploration set of precoders and within one rank to the second precoder. The second precoder corresponds to one of a previously selected precoder for uplink transmission during an exploitation phase and a precoder from a previous exploration set of precoders. According to one or more embodiments of this aspect, each one of the first exploration set of precoders is one of: within a predefined beam direction range of a beam direction of a second precoder of the first exploration set of precoders and associated with a smaller beam direction difference from the second precoder than other precoders omitted from the first exploration set of precoders. The second precoder corresponds to one of a previously selected precoder for uplink transmission during an exploitation phase and a precoder from a previous exploration set of precoders. According to one or more embodiments of this aspect, each one of the first exploration set of precoders is associated with a transition probability greater than a predefined threshold where the transition probability corresponds to a probability that a precoder will be selected for uplink transmission in a next exploitation phase.

According to one or more embodiments of this aspect, the first exploration set of precoders are a subset of precoders available for the wireless device. According to one or more embodiments of this aspect, the first precoder is configured to be implemented for uplink transmission for an exploitation phase time period. According to one or more embodiments of this aspect, the exploitation phase time period is based on one of: a mobility level of the wireless device; and a reception quality metric performance loss associated with a previous exploration set of precoders. According to one or more embodiments of this aspect, the predefined exploitation selection criterion is met if the first precoder corresponds to a previously selected precoder of the first exploration set of precoders that corresponds to a previous exploration set.

According to one or more embodiments of this aspect, the processing circuitry is further configured to, based on the determined first precoder not meeting the predefined criterion: cause transmission of signaling of a one or more uplink grants indicating the second exploration set of precoders for the second plurality of uplink transmissions, each precoder of the second exploration set of precoders being associated with a different uplink transmission of the second plurality of uplink transmissions; determine a second plurality of reception quality metrics associated with the second plurality of uplink transmissions; determine a third precoder of the second exploration set of precoders based at least in part on the second plurality of reception quality metrics; select the third precoder of the second exploration set of precoders for uplink transmission based on the third precoder meeting the predefined exploitation selection criterion; and form a third exploration set of precoders to be associated with a third plurality of uplink transmissions based on the third precoder failing to meet the predefined exploitation selection criterion.

According to one or more embodiments of this aspect, a reception quality metric corresponds to a measure of a potential to successfully to receive and decode an uplink transmission. According to one or more embodiments of this aspect, each of the first plurality of reception quality metrics is a normalized information carrying capacity, ICC, metric.

According to another aspect of the disclosure, a method implemented in a network node that is configured to communicate with a wireless device is provided. Transmission is caused of signaling of one or more uplink grants indicating a first exploration set of precoders for a first plurality of uplink transmissions where each precoder of the first exploration set of precoders is associated with an uplink transmission of the first plurality of uplink transmissions. A first plurality of reception quality metrics associated with the first plurality of uplink transmissions are determined. A first precoder of the first exploration set of precoders is determined based at least in part on the first plurality of reception quality metrics. The first precoder of the first exploration set of precoders for uplink transmission is selected based at least on the first precoder meeting a predefined exploitation selection criterion. A second exploration set of precoders to be associated with a second plurality of uplink transmissions is formed based at least on the first precoder failing to meet the predefined exploitation selection criterion.

According to one or more embodiments of this aspect, each one of the first exploration set of precoders is one of equal in rank to a second precoder of the first exploration set of precoders and within one rank to the second precoder. The second precoder corresponds to one of a previously selected precoder for uplink transmission during an exploitation phase and a precoder from a previous exploration set of precoders. According to one or more embodiments of this aspect, each one of the first exploration set of precoders is one of: within a predefined beam direction range of a beam direction of a second precoder of the first exploration set of precoders and associated with a smaller beam direction difference from the second precoder than other precoders omitted from the first exploration set of precoders. The second precoder corresponds to one of a previously selected precoder for uplink transmission during an exploitation phase and a precoder from a previous exploration set of precoders. According to one or more embodiments of this aspect, each one of the first exploration set of precoders is associated with a transition probability greater than a predefined threshold where the transition probability corresponds to a probability that a precoder will be selected for uplink transmission in a next exploitation phase.

According to one or more embodiments of this aspect, the first exploration set of precoders are a subset of precoders available for the wireless device. According to one or more embodiments of this aspect, the first precoder is configured to be implemented for uplink transmission for an exploitation phase time period. According to one or more embodiments of this aspect, the exploitation phase time period is based on one of: a mobility level of the wireless device; and a reception quality metric performance loss associated with a previous exploration set of precoders. According to one or more embodiments of this aspect, the predefined exploitation selection criterion is met if the first precoder corresponds to a previously selected precoder of the first exploration set of precoders that corresponds to a previous exploration set.

According to one or more embodiments of this aspect, based on the determined first precoder not meeting the predefined criterion: transmission is caused of signaling of a one or more uplink grants indicating the second exploration set of precoders for the second plurality of uplink transmissions where each precoder of the second exploration set of precoders is associated with a different uplink transmission of the second plurality of uplink transmissions; a second plurality of reception quality metrics associated with the second plurality of uplink transmissions are determined; a third precoder of the second exploration set of precoders is determined based at least in part on the second plurality of reception quality metrics; the third precoder of the second exploration set of precoders for uplink transmission is selected based on the third precoder meeting the predefined exploitation selection criterion; and a third exploration set of precoders to be associated with a third plurality of uplink transmissions is formed based on the third precoder failing to meet the predefined exploitation selection criterion.

According to one or more embodiments of this aspect, a reception quality metric corresponds to a measure of a potential to successfully to receive and decode an uplink transmission. According to one or more embodiments of this aspect, each of the first plurality of reception quality metrics is a normalized information carrying capacity, ICC, metric.

Therefore the teachings described herein provide one or more of the following advantages:

- provides for adaptive selection of the number of spatial layers and precoding matrix for uplink transmission based, for example, only on the information provided from previous uplink receptions.
- provides for a very low computational complexity as processing or storage of uplink channel estimates or their statistics for selecting the number of uplink layers or uplink precoding are not required.
- provides for a robust algorithm/method/process that is robust against modelling and/or estimation errors in the uplink channel.
- provides performance that is close to optimal precoding selection algorithm according to simulation results while offering significant savings in computational complexity and memory requirements.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart of an example process in a network node according to some embodiments of the present disclosure;

DETAILED DESCRIPTION

Figure 1:
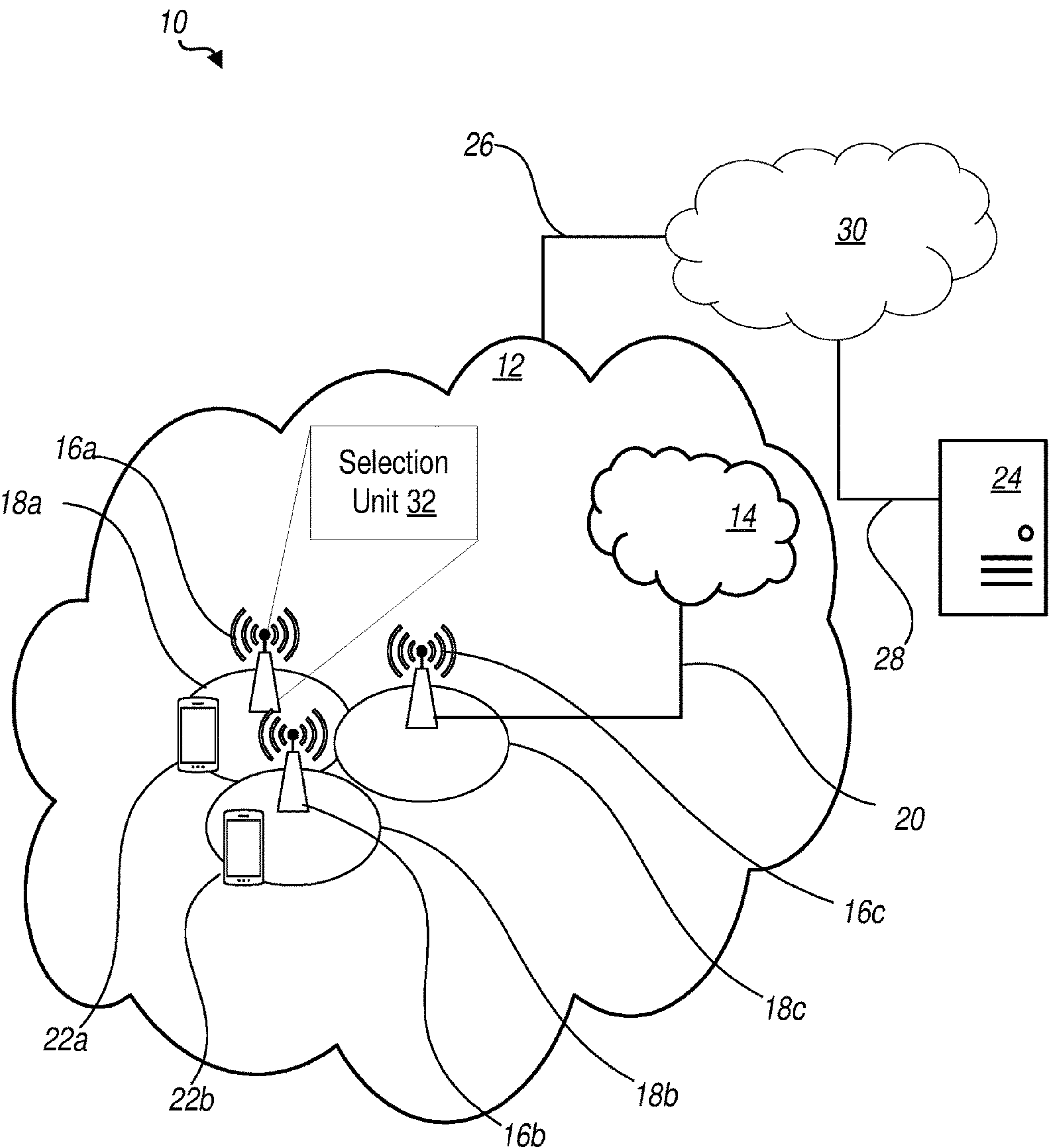
FIG. 1 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to codebook-based precoder selection based on information provided from previous uplink receptions. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide codebook-based precoder selection based on information provided from previous uplink receptions.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NB s, eNB s, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a selection unit 32 which is configured to perform one or more network node 16 functions as described herein such as with respect to codebook-based precoder selection based at least on information provided from previous uplink receptions.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of process, store, transmit, receive, determine, relay, forward, communicate, etc., information with respect to codebook-based precoder selection based at least on information provided from previous uplink receptions.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include selection unit 32 configured to perform one or more network node 16 functions as described herein such as with respect to codebook-based precoder selection based at least on information provided from previous uplink receptions.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
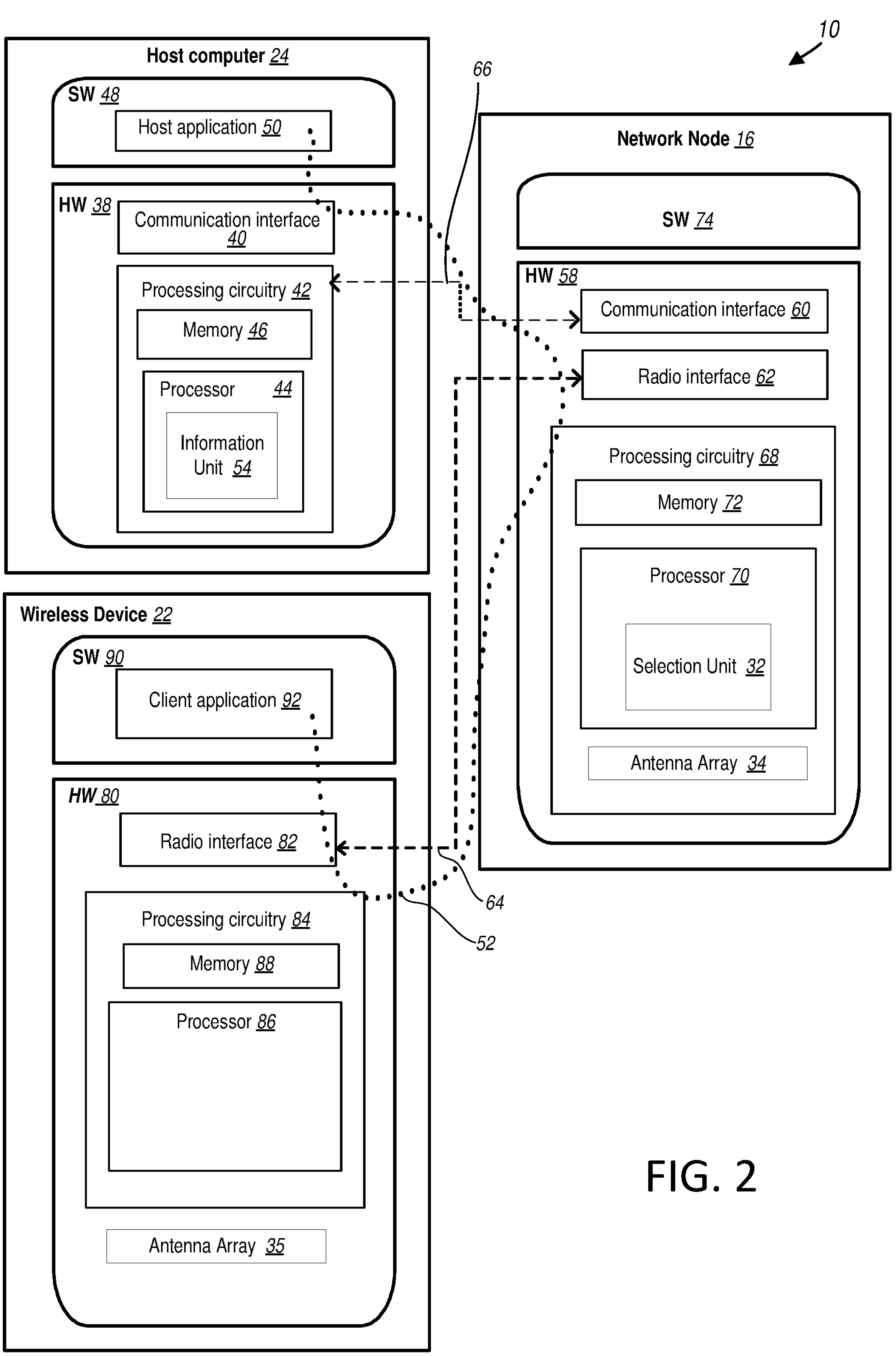
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as selection unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
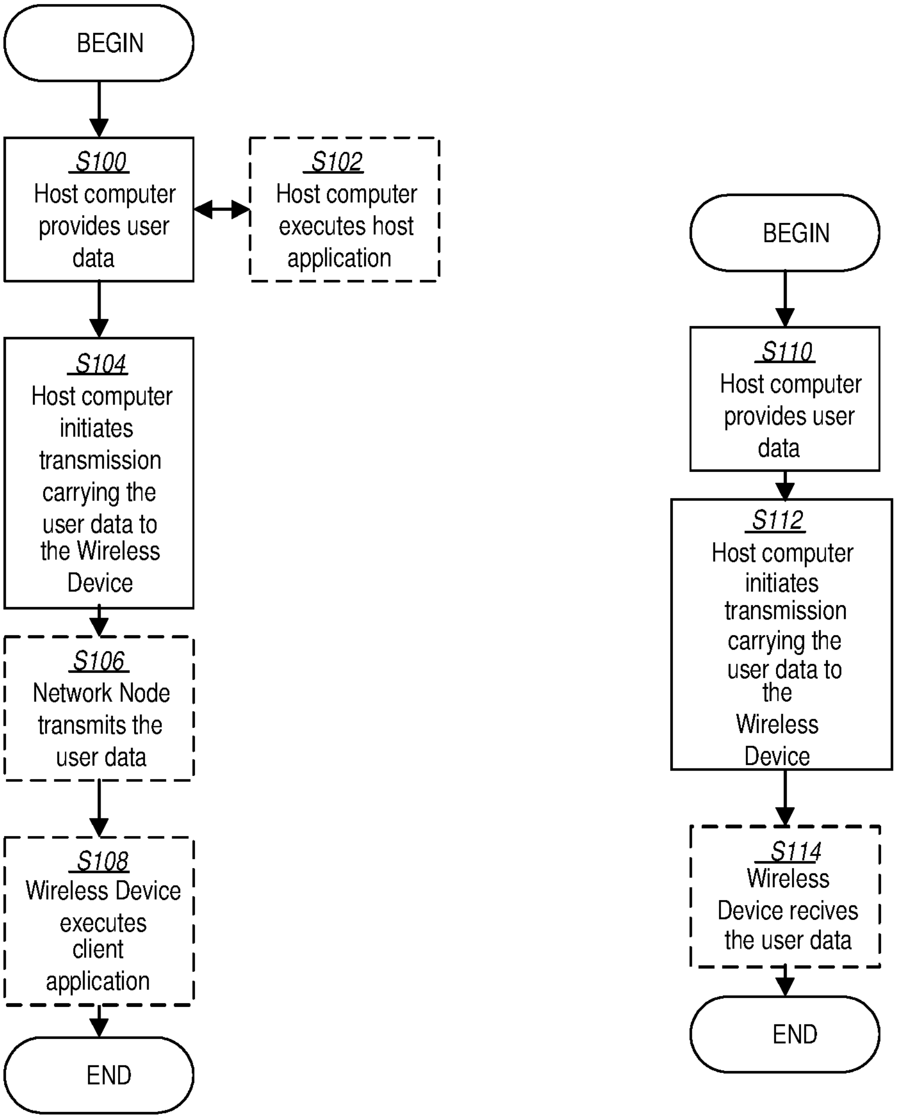
FIG. 3 is a flowchart illustrating example methods implemented in a communication system including a host computer, a network node and a wireless device for executing a client application at a wireless device according to some embodiments of the present disclosure.
FIG. 4 is a flowchart illustrating example methods implemented in a communication system including a host computer, a network node and a wireless device for receiving user data at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
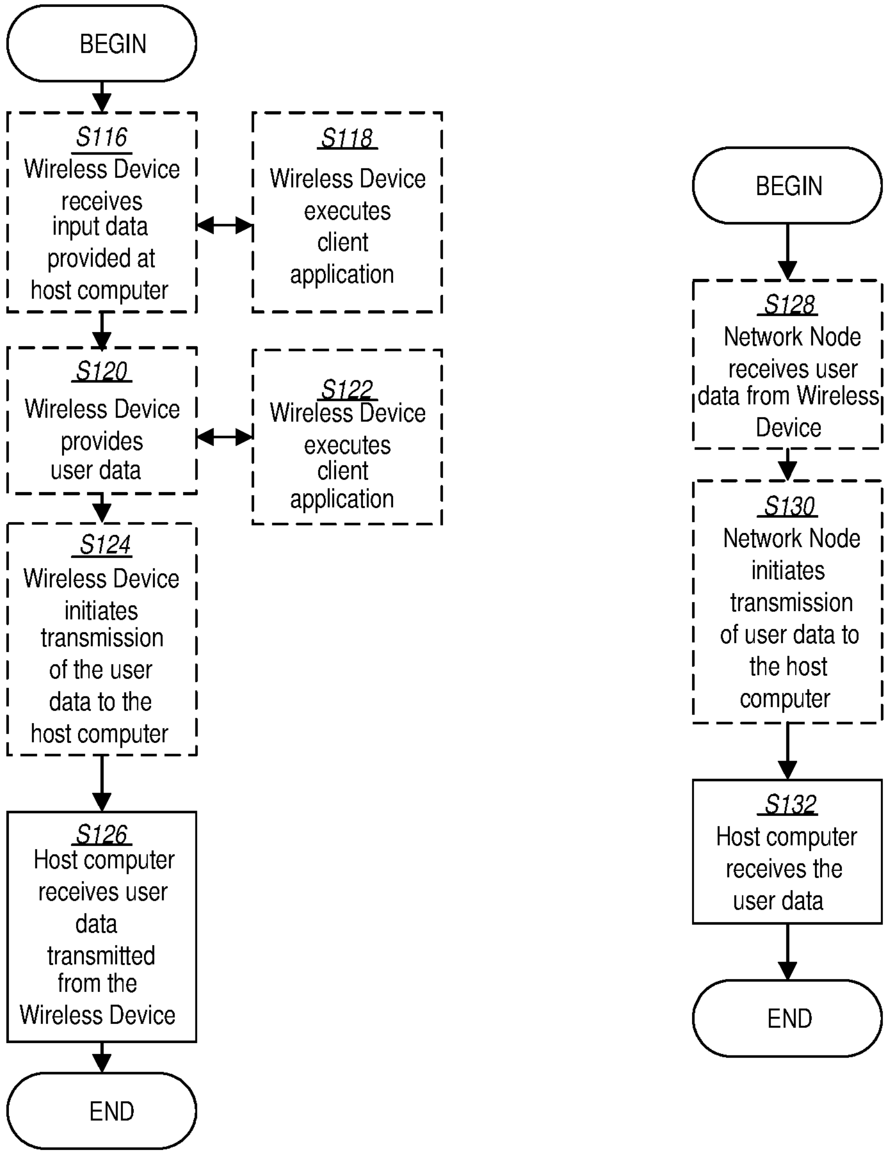
FIG. 5 is a flowchart illustrating example methods implemented in a communication system including a host computer, a network node and a wireless device for receiving user data from the wireless device at a host computer according to some embodiments of the present disclosure.
FIG. 6 is a flowchart illustrating example methods implemented in a communication system including a host computer, a network node and a wireless device for receiving user data at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 7 is a flowchart of an example process (i.e., selection method) in a network node 16 according to some embodiments of the present disclosure. One or more Blocks and/or functions performed by network node 16 may be performed by one or more elements of network node 16 such as by selection unit 32 in processing circuitry 68, processor 70, radio interface 62, etc. In one or more embodiments, network node 16 such as via one or more of processing circuitry 68, processor 70, selection unit 32, communication interface 60 and radio interface 62 is configured to cause transmission (Block S 136) of signaling of one or more uplink grants indicating an first exploration set of precoders for a first plurality of uplink transmissions where each precoder of the first exploration set of precoders is associated with an uplink transmission of the first plurality of uplink transmissions, as described herein.

In one or more embodiments, network node 16 such as via one or more of processing circuitry 68, processor 70, selection unit 32, communication interface 60 and radio interface 62 is configured to determine (Block S 138) a first plurality of reception quality metrics associated with the first plurality of uplink transmissions, as described herein. For example, the reception quality metrics may be based on uplink data transmission and not based uplink reference signals. In one or more embodiments, network node 16 such as via one or more of processing circuitry 68, processor 70, selection unit 32, communication interface 60 and radio interface 62 is configured to determine (Block S 140) a first precoder of the first exploration set of precoders based at least in part on the first plurality of reception quality metrics, as described herein. In one or more embodiments, network node 16 such as via one or more of processing circuitry 68, processor 70, selection unit 32, communication interface 60 and radio interface 62 is configured to select (Block S 142) the first precoder of the first exploration set of precoders for uplink transmission based at least on the first precoder meeting a predefined exploitation selection criterion, as described herein. In one or more embodiments, network node 16 such as via one or more of processing circuitry 68, processor 70, selection unit 32, communication interface 60 and radio interface 62 is configured to form (Block S 144) a second exploration set of precoders to be associated with a second plurality of uplink transmissions based at least on the first precoder failing to meet the predefined exploitation selection criterion, as described herein.

According to one or more embodiments, each one of the first exploration set of precoders is one of equal in rank to a second precoder of the first exploration set of precoders and within one rank to the second precoder where the second precoder corresponds to one of a previously selected precoder for uplink transmission during an exploitation phase and a precoder from a previous exploration set of precoders. According to one or more embodiments, each one of the first exploration set of precoders is one of: within a predefined beam direction range of a beam direction of a second precoder of the first exploration set of precoders and associated with a smaller beam direction difference from the second precoder than other precoders omitted from the first exploration set of precoders, and the second precoder corresponds to one of a previously selected precoder for uplink transmission during an exploitation phase and a precoder from a previous exploration set of precoders. According to one or more embodiments, each one of the first exploration set of precoders is associated with a transition probability greater than a predefined threshold where the transition probability corresponds to a probability that a precoder will be selected for uplink transmission in a next exploitation phase. According to one or more embodiments, the first exploration set of precoders are a subset of precoders available for the wireless device.

According to one or more embodiments, the first precoder is configured to be implemented for uplink transmission for an exploitation phase time period. According to one or more embodiments, the exploitation phase time period is based on one of: a mobility level of the wireless device, and a reception quality metric performance loss associated with a previous exploration set of precoders. According to one or more embodiments, the predefined exploitation selection criterion is met if the first precoder corresponds to a previously selected precoder of the first exploration set of precoders that corresponds to a previous exploration set.

According to one or more embodiments, the processing circuitry is further configured to, based on the determined first precoder not meeting the predefined criterion: cause transmission of signaling of a one or more uplink grants indicating the second exploration set of precoders for the second plurality of uplink transmissions where each precoder of the second exploration set of precoders is associated with a different uplink transmission of the second plurality of uplink transmissions; determine a second plurality of reception quality metrics associated with the second plurality of uplink transmissions; determine a third precoder of the second exploration set of precoders based at least in part on the second plurality of reception quality metrics; select the third precoder of the second exploration set of precoders for uplink transmission based on the third precoder meeting the predefined exploitation selection criterion; and form a third exploration set of precoders to be associated with a third plurality of uplink transmissions based on the third precoder failing to meet the predefined exploitation selection criterion. According to one or more embodiments, a reception quality metric corresponds to a measure of a potential to successfully to receive and decode an uplink transmission. According to one or more embodiments, each of the first plurality of reception quality metrics is a normalized information carrying capacity, ICC, metric.

Having generally described arrangements for codebook-based precoder selection based on information provided from previous uplink receptions, details for these arrangements, functions and processes are provided as follows, and which may be implemented by the network node 16, wireless device 22 and/or host computer 24.

Embodiments provide codebook-based precoder selection based on information provided from previous uplink receptions.

System Description

In one or more embodiments, the system may be a MIMO wireless cellular system such as communication system 10, including network node 16 and one or multiple connected wireless devices 22. It may be assumed that the network node 16 has an N-element antenna array 34 and that the wireless devices 22 is equipped with an M-element antenna 35. The wireless device 22 transmits L independent data streams (layers/spatial layers) to the network node 16 using the M×L wideband precoding matrix $W_L$. The precoding matrix is used for all the available frequency bands assigned to the wireless device 22 for its uplink transmission and is signaled to the wireless device 22 by the network node 16 such as via one or more of processing circuitry 68, processor 70, radio interface 62, selection unit 32, etc., prior to time instant t together with the uplink transmission grant. The number of layers L is selected by the network node 16 where $1 \leq L \leq L_{max}$ and $L_{max} \leq \min(M,N)$ is the maximum number of layers that can be transmitted by the wireless device in the uplink. Accordingly, the precoding matrix is selected by the network node 16 such as via one or more of processing circuitry 68, processor 70, radio interface 62, selection unit 32, etc., from a finite codebook $\Omega_L$ containing all rank L precoders that can be supported by the wireless device 22. The number of layers and precoding matrix are signaled by the network node such as via one or more of processing circuitry 68, processor 70, radio interface 62, selection unit 32, etc., to the wireless device 22 in the uplink grant to be used in its next uplink transmission.

Figure 8:
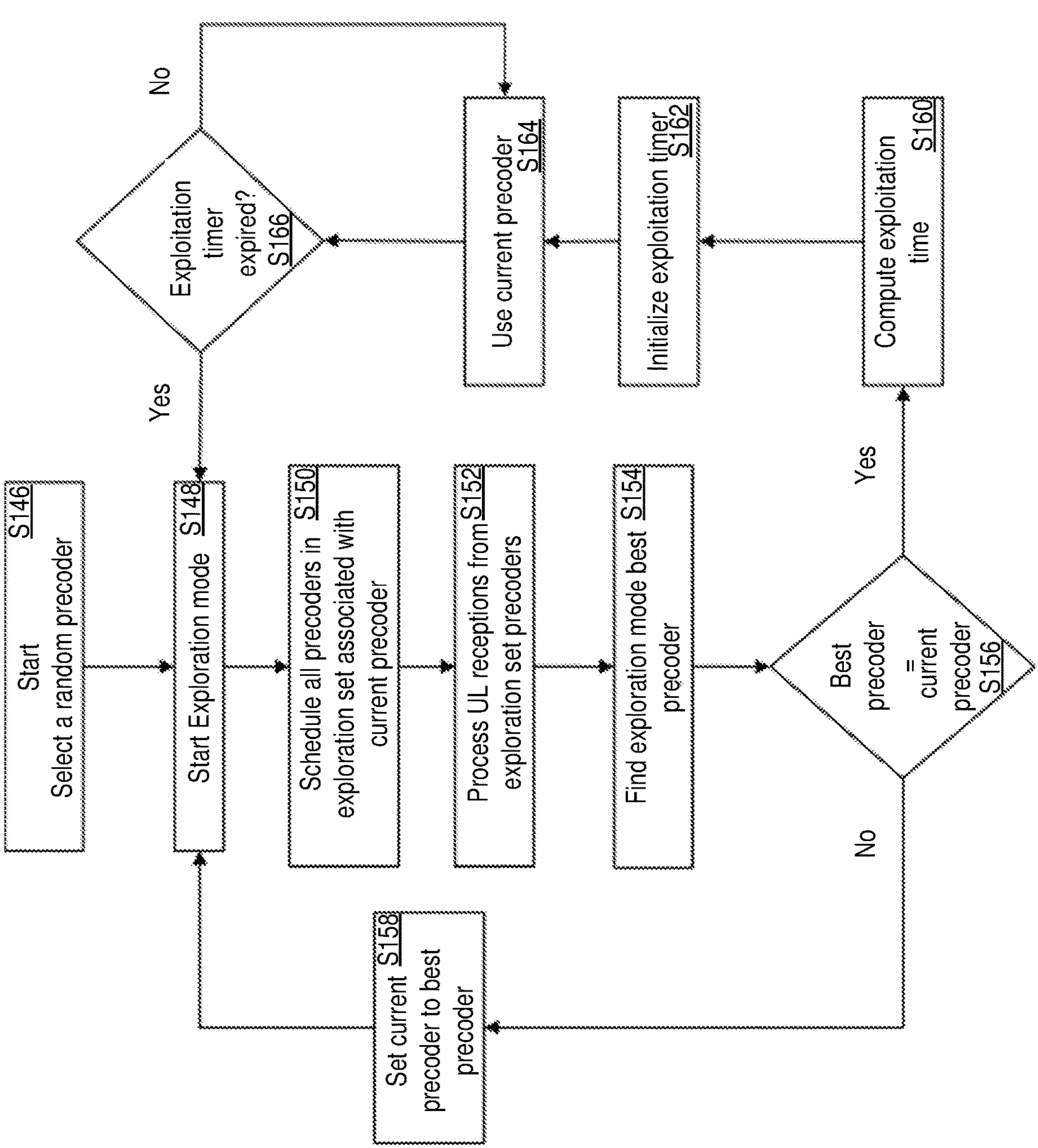
FIG. 8 is a flowchart of another example process in the network node according to some embodiments of the present disclosure.

As described herein, a system, network node 16 and algorithm are provided to determine the precoding matrix $W_L$. The system such as a network node 16 aims at maximizing the information carrying capacity (ICC) of the uplink transmission, i.e., maximizing the number of bits that can be correctly decoded with a target error rate at the network node. FIG. 8 is a block diagram of one example of the uplink SU-MIMO precoding selection algorithm in accordance with teachings of the instant disclosure. The system such as network node 16 has two possible modes/phases of operations. The first mode is called “Exploration Mode” or “Exploration Phase” where the objective is to schedule such as via one or more of processing circuitry 68, processor 70, radio interface 62, selection unit 32, etc., several uplink transmissions to probe a set of candidate spatial transmission directions using different uplink precoding matrices. In the second mode of operation, i.e., "Exploitation Mode" or "Exploitation Phase", one objective of the uplink precoder selection algorithm is to maximize uplink throughput by transmitting in the best spatial directions of the channel known so far where these directions are obtained from processing the uplink receptions corresponding to the transmissions made by the wireless device 22 such as via radio interface 82 during exploration mode The mode selection algorithm in FIG. 8 starts by selecting (Block S146) such as via one or more of processing circuitry 68, processor 70, radio interface 62, selection unit 32, etc., a random transmission rank L and a random precoding matrix from the codebook $\Omega_L$. The algorithm begins (Block S148) in exploration mode or in an exploration phase where a set of precoding matrices, referred to as the exploration set and denoted by $P_{W_L}$, is defined for each precoding matrix $W_L \in \Omega_L$ for each $$1 \le L \le L_{max},\ P_{W_L} \subset \{\Omega_1, \ldots, \Omega_L, \ldots \Omega_{L_{max}}\}.$$

In Exploration mode, the selected precoder, $W_L$, and the precoders in the associated exploration set, $P_{W_L}$, are used to schedule uplink transmissions such as via one or more of processing circuitry 68, processor 70, radio interface 62, selection unit 32, etc., from the wireless devices 22 such as via one or more uplink grants where each precoder is used at least once in an uplink transmission (Block S150). Hence, the minimum number of required uplink transmissions for exploration is given by $|P_{W_L}|+1$ where $|S|$ denotes the cardinality of the set S. The uplink receptions corresponding to the scheduled exploration mode transmissions are processed by the network node 16 such as via one or more of processing circuitry 68, processor 70, radio interface 62, selection unit 32, etc., and a reception quality metric $\rho(W_i)$ is computed for each reception and associated with the precoder $W_i$ used by the wireless devices 22 in the corresponding transmission (Block S152). Further, the computation and association of Block S152 may be performed by the network node 16 such as via one or more of processing circuitry 68, processor 70, radio interface 62, selection unit 32, etc.

In Block S154, the best number of layers K and the associated first precoder corresponding to the best exploration mode precoder $$W_K^{(Best)}$$

can be evaluated such as via one or more of processing circuitry 68, processor 70, radio interface 62, selection unit 32, etc., by comparing the reception quality metrics associated with the exploration mode transmissions, i.e., $$W_K^{(Best)} = \underset{W_i \in \{W_L, P_{W_L}\}}{\operatorname{argmax}} \rho(W_i).$$

Note that the number of layers of the best precoder, K, can be different from the number of layers of the current selected precoder, L as determined by network node 16 such as via one or more of processing circuitry 68, processor 70, radio interface 62, selection unit 32, etc., in Block S156. For example, network node 16 such as via one or more of processing circuitry 68, processor 70, radio interface 62, selection unit 32, etc., determine whether a predefined exploitation selection criterion is met where the criterion may correspond to $$W_K^{(Best)} = W_L,$$

for example.

Hence, the algorithm described herein can automatically select the best number of layers to be transmitted by the wireless device 22 in the uplink as well as the associated precoding matrix. Further, in one or more embodiments, the algorithm described herein uses uplink transmissions such as data transmission scheduled by uplink grants such that it is not based on reference signal estimation.

As illustrated FIG. 8, Block S158, exploration mode transmissions are repeated such as via one or more of processing circuitry 68, processor 70, radio interface 62, selection unit 32, etc., if the first precoder is different from the currently (selected precoder, i.e., if $$W_K^{(Best)} \ne W_L$$

or the first precoder fails to meet the predefined exploration selection criteria. In this case, the exploration procedure is repeated such as via one or more of processing circuitry 68, processor 70, radio interface 62, selection unit 32, etc., where $W_L$ is set as $$W_K^{(Best)}$$

(Block s158). For example, in one or more embodiments, a second or another exploration set of precoders is formed.

On the other hand, referring back to Block S156, if $$W_K^{(Best)} = W_L,$$

i.e., if the current precoder is the best precoder among all its neighbors in the exploration set, then the uplink precoding selection is switched such as via one or more of processing circuitry 68, processor 70, radio interface 62, selection unit 32, etc., to exploitation mode where the current precoder is used in all future uplink transmissions for an exploitation time interval $T_{Exploit}$, i.e., a timer is computed (Block S160) and initialized (Block S162) with the value $T_{Exploit}$ and the current precoder is used during exploitation mode until the exploitation timer expires (Blocks S164-S166). For example, the network node 16 may cause the wireless device 22 to enter the exploitation mode/phase by, for example, scheduling the wireless device to use the current precoder until the exploitation timer expires. The transmission mode is switched back to exploration mode when the timer expires. Switching between exploration mode/phase and exploitation mode/phase may corresponds to the network node 16 scheduling or providing one or more UL grants to the wireless device 22 such that the wireless device 22 operates in the uplink according to the exploration phase or exploitation phase that are described herein.

Exploration Set Generation

For each precoder $W_L \in \Omega_L$, a set $P_{W_L}$ is defined that contains all the precoders that should be used by the wireless device 22 during exploration mode, in addition to $W_L$, in order to obtain the local-optimum uplink precoding directions. In this Exploration Set Generation section, several techniques/methods as described for generating the exploration set, which are described below.

Rank Neighbors-Based Exploration Set Generation

The exploration set can be constructed such as via one or more of processing circuitry 68, processor 70, radio interface 62, selection unit 32, etc., such that it contains all the uplink precoders in the codebook with a rank equal to the rank of the current precoder or with a rank difference equal to 1, i.e., the exploration set for the precoder $W_L$ is given by $$P_{W_L} = \{\Omega_{max\{L-1,1\}}, \Omega_L, \Omega_{min\{L+1,M\}}\}.$$

Figure 9:
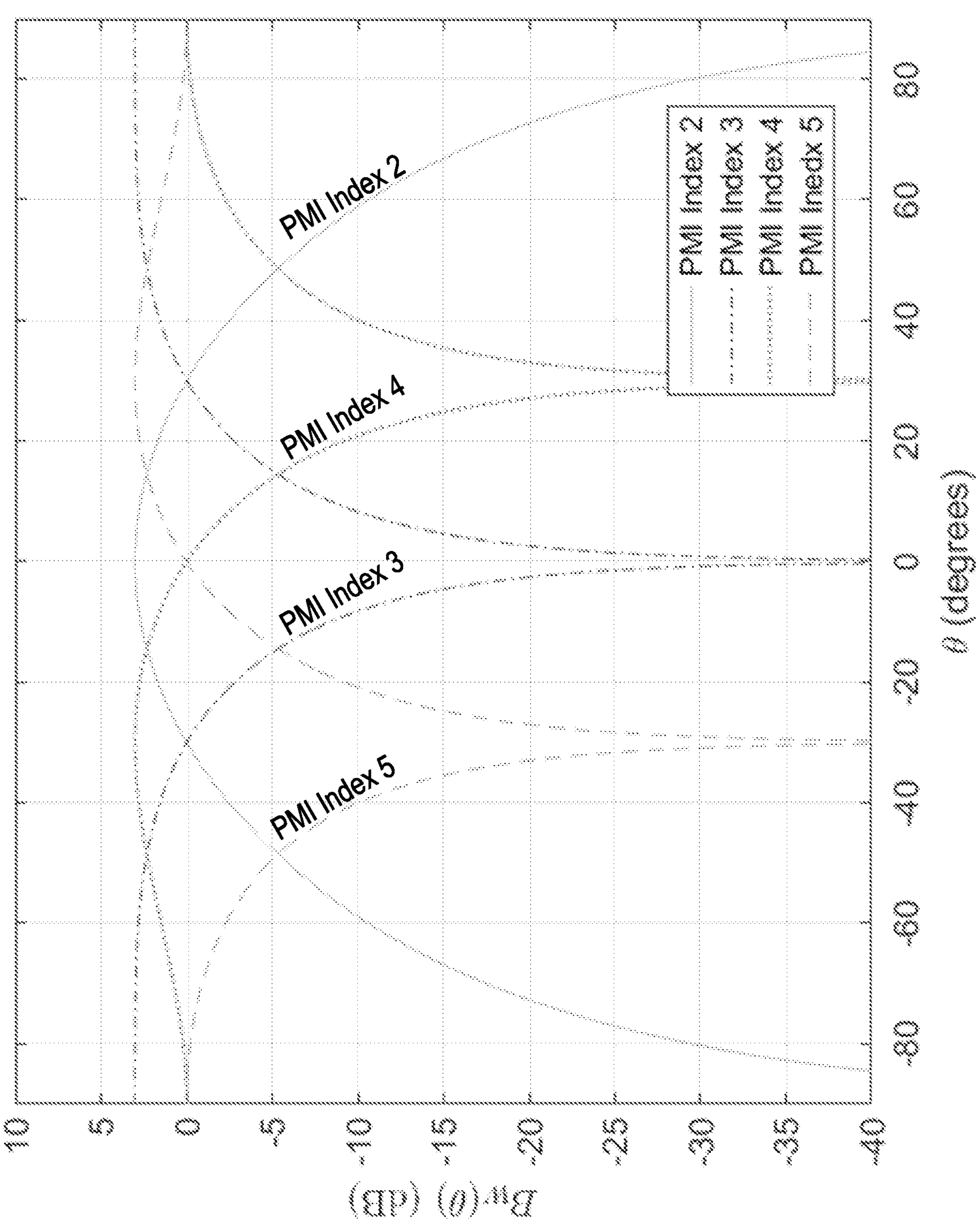
FIG. 9 is diagram of a beampattern for different precoding matrix indicator for a wireless device.

The rank neighbors-based exploration set may be considered a fixed set and may generally have a longer exploration time when compared to generated sets described herein as a full set for the rank is used. However, this exploration set may allow the selection algorithm to find the best precoder for the exploitation mode/phase in one exploration cycle where the best precoder may be reached faster than other generated exploration sets described herein if the best precoder far from the current precoder. FIG. 9 is a diagram of an example beampattern for different PMIs for fully coherent wireless device 22, M=2, L=1, where, in one example, the rank neighbors-based exploration set may correspond to all for precoders in FIG. 9. FIG. 9 is described in more detail below.

Beampattern Neighbors-Based Exploration Set Generation

The exploration set associated with a given precoder can be constructed such as via one or more of processing circuitry 68, processor 70, radio interface 62, selection unit 32, etc., such that it contains the uplink precoders with the closest beam direction to the beam direction of the given precoder. Alternatively, the exploration set can also be constructed to contain the precoders with a beam direction that lies within a certain proximity of the beam direction of the given precoder. For example, the beampattern associated with the precoder $W_L$ is defined as $$B_{W_L}(\theta, \phi) = \sum_{i=1}^{L} \left|W_{L,i}^T\ a(\theta, \phi)\right|^2$$

where $W_{L,i}$ denotes the ith column of the precoding matrix $W_L$, i.e., the precoder corresponding to layer i, $(\ )^T$ denotes the vector transpose operator and a(θ,Ø) is the M×1 array manifold vector that characterizes the radiation pattern of the wireless device 22 antenna array 35 in the elevation direction θ and azimuth direction Ø. For example, for a wireless device 22 array with identical elements located at $$\{(x_i, y_i, z_i)\}_{i=1}^{M},$$

the ith element of the array manifold vector, $a_i$(θ,Ø), is given by $$a_i\left(\theta, \phi = \exp\left(j\frac{2\pi}{\lambda}x_i\ \sin(\theta)\cos(\phi) + y_i\ \sin(\theta)\sin(\phi) + z_i\ \cos(\theta)\right)\right.$$

where $j=\sqrt{-1}$ and λ is the wavelength of the carrier used for uplink transmission.

Next, the 3×1 vector that defines the beam direction associated with the precoder $W_L$ is defined as $$r(\theta_{W_L}, \phi_{W_L}) = \left[\sin(\theta_{W_L})\cos(\phi_{W_L})\ \sin(\theta_{W_L})\sin(\phi_{W_L})\ \cos(\theta_{W_L})\right]^T$$

where $(\theta_{W_L}, Ø_{W_L})$ is the azimuth/elevation angles that yields the maximum value of the beampattern associated with the precoder $W_L$, i.e., $$(\theta_{W_L}, \phi_{W_L}) = \underset{\theta,\phi}{\mathrm{argmax}}\ B_{W_L}(\theta, \phi)$$

The rank-K closest beam neighbors of $W_L$ is defined as the set containing all the M×K precoders $V_K \in \Omega_K$ that solve the following optimization problem $$\max_{V_K \in \Omega_K} \langle r(\theta_{W_L}, \phi_{W_L}), r(\theta_{V_K}, \phi_{V_K})\rangle$$

where ⟨a, b⟩ denotes an inner product operator for the two vectors a and b. In other words, the rank-K closest beam neighbors of precoder $W_L$ contains all the M×K precoders in the codebook $\Omega_K$ whose direction of maximum beampattern is the closest to the direction of maximum beampattern of $W_L$. The "closest" may correspond to a smallest different in angle among neighbors. For each precoder $W_L$, the beampattern neighbors-based exploration set is defined as the set containing the rank L closest beam neighbors, rank min {L+1, M} closest beam neighbors, and rank max {L−1, 1} closest beam neighbors.

Note that when the locations of the wireless device antenna elements in antenna array 35 are known or can be estimated, they can be used to evaluate the array manifold vector a(θ,Ø). In the case, when the antenna element locations are unknown, a uniform linear antenna array 35 structure with half wavelength spacing is assumed, $$\text{i.e., } x_i = \frac{\lambda}{2}(i-1),\ y_i = 0,\ z_i = 0.$$

As an example, the case of a wireless device 22 with M=2 antennas is considered, and an uplink precoding codebook from wireless communication standards such as third generation partnership projection (3GPP) Release 15 for the case of L=1 transmission layers is considered. In this case, the precoding matrices are given by Table 6.3.1.5-1 (reproduced below) of 3GPP technical specification (TS) 38.211 v15.5.0.

| TPMI index | W (ordered from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

FIG. 9 illustrates the beam pattern for different precoders for a wireless device 22 with coherent transmission capability where PMI indices 2-5 are preferred to provide the highest beamforming gain. The beampattern in FIG. 9 was evaluated assuming a uniform linear array with half wavelength spacing. As illustrated in FIG. 9, the rank-1 closest beam neighbors of the precoder with PMI index 2 are the precoders with PMI indices 4 and 5. Similarly, the closest beam neighbors of the precoder with PMI index 5 are the precoders with PMI indices 2 and 3.

Alternatively, the rank-K beam neighbors of $W_L$ with a given proximity measure R can be defined as the set $B_K(W_L, R)$ containing all the M×K precoders $V_K \in \Omega_K$ given by $$B_K(W_L, R) = \{V_K \mid \langle r(\theta_{W_L}, \phi_{W_L}), r(\theta_{V_K}, \phi_{V_K})\rangle \geq R\}.$$

Hence, not only are the precoders with beam direction closest to the beam direction of $W_L$ considered such as via one or more of processing circuitry 68, processor 70, radio interface 62, selection unit 32, etc., but also those that lie within a certain proximity measure. For each precoder $W_L$, the associated exploration set is formed such as via one or more of processing circuitry 68, processor 70, radio interface 62, selection unit 32, etc., by considering the set containing the rank L proximity beam neighbors, rank min {L+1, M} proximity beam neighbors, and rank max {L−1,1} proximity beam neighbors.

The beampattern neighbors-based exploration set generation may provide the best tradeoff in terms of average time exploration time. For example, the beampattern neighbors-based exploration set is a fixed set of a subset of precoders such as a subset of the precoders that may be used for the Rank Neighbors-based Exploration set generation. Referring back to FIG. 9, in one example, the beampattern neighbors-based set may include only PMI index 3. Therefore, the beam pattern neighbors-based set may need more than one exploration phase loop (i.e., more than one loop in FIG. 8) but if one exploration phase loop finds the best precoder, the exploration time may be the shortest of the other generation methods described herein.

Adaptive Exploration Set Generation

The exploration set can be adaptively constructed such as via one or more of processing circuitry 68, processor 70, radio interface 62, selection unit 32, etc., based on the results of previous exploration phases. A transition probability (denoted by $p(V_K|W_L)$) is associated with each possible neighbor precoder $V_K$ of the current precoder $W_L$. The transition probability represents the probability that the precoder $V_K$ is the optimum exploitation precoder in the next exploitation phase given that precoder $W_L$ is the optimum exploitation precoder in the current exploitation phase.

The transition probabilities are updated such as via one or more of processing circuitry 68, processor 70, radio interface 62, selection unit 32, etc., after each exploration interval. During the exploration phase, the precoders in the exploration set are used such as via one or more of processing circuitry 68, processor 70, radio interface 62, selection unit 32, etc., to schedule uplink transmissions for the wireless device 22. In addition, the current precoder $W_L$ is utilized in at least one uplink transmission during exploration. The reception quality metric corresponding to each of these receptions is measured such as via one or more of processing circuitry 68, processor 70, radio interface 62, selection unit 32, etc. Afterwards, the transition probabilities of the precoders utilized in the exploration phase are updated such as via one or more of processing circuitry 68, processor 70, radio interface 62, selection unit 32, etc., based on the reception quality metrics collected during the exploitation phase. For example, the transition probability of the precoder $p(V_K|W_L))$ is updated as $$p(V_K \mid W_L) = \frac{1}{c}\left(\alpha\, p(V_K \mid W_L) + (1-\alpha)\frac{\rho(V_K)}{\Sigma_{U_J \in \{P_{W_L}, W_L\}}\rho(U_J)}\right)$$

where 0≤α≤1 is a constant that controls the memory of the transition probability update algorithm and the constant c is selected to ensure that after updating the transition probabilities, the following results:

$$\sum_K \sum_{V_K} p(V_K \mid W_L) = 1$$

where the summation in the above equation is over all possible neighbor of the precoder $W_L$.

The adaptive exploration set can be constructed such as via one or more of processing circuitry 68, processor 70, radio interface 62, selection unit 32, etc., from the transition probabilities as follows. In the exploration phase following the current exploitation phase, a subset of the neighbors of the current precoder $W_L$ are used such as via one or more of processing circuitry 68, processor 70, radio interface 62, selection unit 32, etc., to construct the exploration set. The subset can be selected such as via one or more of processing circuitry 68, processor 70, radio interface 62, selection unit 32, etc., for example, as one of:

1—The set containing the S precoders with the highest transition probability where S is a given system parameter that determines a fixed size of the exploration set.

2—The set containing the precoders with a transition probability greater than a predefined threshold.

3—The set containing random samples that are drawn (without replacement) from all possible neighbor of the precoder $W_L$ based on the transition probabilities $\{p(V_K|W_L)\}$ Reception Quality Metric The reception quality metric $\rho(W_L)$ is a measure of the ability of the uplink to successfully transmit data from the wireless device 22 to the network node 16. The computation of the reception quality metric such as via one or more of processing circuitry 68, processor 70, radio interface 62, selection unit 32, etc., should be relatively accurate since the network node 16 has access to all the required information after processing the uplink receptions. One or more metrics can be used individually or in combination to indicate the reception quality metric. For example, the normalized ICC of the uplink can be used as the reception quality metric. Let $SINR(f_i, V_K)$ denote the estimate of the signal to interference-plus-noise ratio (SINR) at the output of the uplink receiver (i.e., at output of radio interface 62) at frequency $f_i$ obtained from processing the uplink reception associated with the precoder $V_K$, such that the normalized ICC can be computed as $$\eta(V_K) = \frac{1}{N_f}\sum_{i=1}^{N_f}\log(1 + SINR(f_i, V_K))$$

where $N_f$ is the number of frequency bins for which an estimate for the SINR can be obtained by the uplink receiver, i.e., the number of frequency bins used in the uplink transmission in which the precoder $V_K$ was utilized.

Exploitation Mode/Phase Duration

The duration of the exploitation mode $T_{Exploit}$ controls the tradeoff between exploring new precoding directions for further improving the system performance and exploiting the current information about the best precoding directions. In this section, two methods for selecting such as via one or more of processing circuitry 68, processor 70, radio interface 62, selection unit 32, etc., the exploitation mode interval as described although other methods/processes may be used in accordance with the teachings of the instant disclosure.

Mobility-Based Exploitation Mode Duration Selection

A semi-static exploitation mode duration can be selected such as via one or more of processing circuitry 68, processor 70, radio interface 62, selection unit 32, etc., based on the mobility level of the wireless device 22 where the duration of the exploitation mode decreases as the mobility of the wireless device 22 increases. This allows the precoding selection algorithm implemented by the network node 16 to track the changes in the uplink channel characteristics. For example, the exploitation mode duration can be selected as $$T_{Exploit} = \alpha T_c$$

where α is a fixed scalar parameter, e.g., α=1, and $T_c$ is the coherence time of the wireless device 22 channel which is inversely proportional to the wireless device 22 mobility level.

Reception Quality-Based Exploitation Mode Duration Selection

During exploration, the current precoder $W_L$ and all the precoders in the associated exploration set $P_{W_L}$ are used such as via one or more of processing circuitry 68, processor 70, radio interface 62, selection unit 32, etc., to schedule uplink transmissions. The minimum number of required uplink transmissions for exploration is given by $|P_{W_L}|+1$. There may be a performance loss typically associated with exploration mode where some of the exploration set precoders might result in uplink transmissions in non-favorable spatial directions. The duration of the exploitation mode can be selected such as via one or more of processing circuitry 68, processor 70, radio interface 62, selection unit 32, etc., based on the results of the latest exploration phase to reduce the performance loss in the next exploration phase. In particular, the exploitation mode duration should increase when the exploration phase performance loss increases. For example, $$W_{K'}^{(Worst)} \in \{W_L, P_{W_L}\}$$

is defined as the precoder that yielded the worst reception quality metric during the last exploration phase associate with the precoder $W_L$, i.e., $$W_{K'}^{(Worst)} = \underset{W_i \in \{W_L, P_{W_L}\}}{\text{argmin}} \rho(W_i)$$

The exploitation mode interval can be computed such as via one or more of processing circuitry 68, processor 70, radio interface 62, selection unit 32, etc., from the results of the exploration phase as $$T_{Exploit} = \frac{\rho(W_K^{(Best)} - \rho(W_{K'}^{(Worst)})}{\rho(W_K^{(Best)})} T_0$$

where $T_0$ is a parameter that controls the maximum exploitation time, for example $T_0=\alpha T_c$ can be used to enable tracking the mobility level of the wireless device 22. Note that the above choice increases the exploitation mode duration proportional to the largest loss in reception quality metric during exploration.

Performance Evaluation

The performance of the uplink SU-MIMO precoding technique described herein using system-level simulations is described below. A 5G cellular system with bandwidth 30 MHz and carrier frequency 3.5 GHz is simulated. The system operates in time division duplex mode where the Downlink/Uplink timeslot pattern is 3/1. A 7-site deployment scenario is considered where each site has 3 cells, the inter-site distance is equal to 500 m and the wireless devices 22 are located randomly in the simulation area. It is assumed that all the wireless device 22 have non-coherent uplink transmission capabilities where the number of uplink transmission antennas is equal to 2. Hence, the maximum number of uplink layers is given by 2. The uplink codebook for non-coherent 2Tx wireless devices 22 as described 3GPP, TS 38.211 v15.5.0 is utilzed. The 5G Spatial Channel Mode (SCM) Urban Macro channel model with non-line of sight (NLOS) communication is used in this simulation. The antenna configuration, i.e., antenna array 34, at the network node 16 is the Advanced Antenna System (AAS) AIR 6488 (4×8×2) configuration. The traffic model for the uplink is selected as full buffer.

The performance of the precoding algorithm described herein (labeled as "Selection Method") is compared with that of an existing optimal uplink precoding selection algorithm (labeled as "Optimal uplink precoding") where the channel estimates are obtained using a full band 2-Port sounding reference symbol which is transmitted by each wireless device 22 every 2.5 msec. As a benchmark for comparison, a legacy uplink transmission scheme (labeled "1-layer transmission") where each scheduled wireless device 22 transmits 1-layer in the uplink from antenna port 0 of antenna array 35 with full available power is also simulated.

Figure 10:
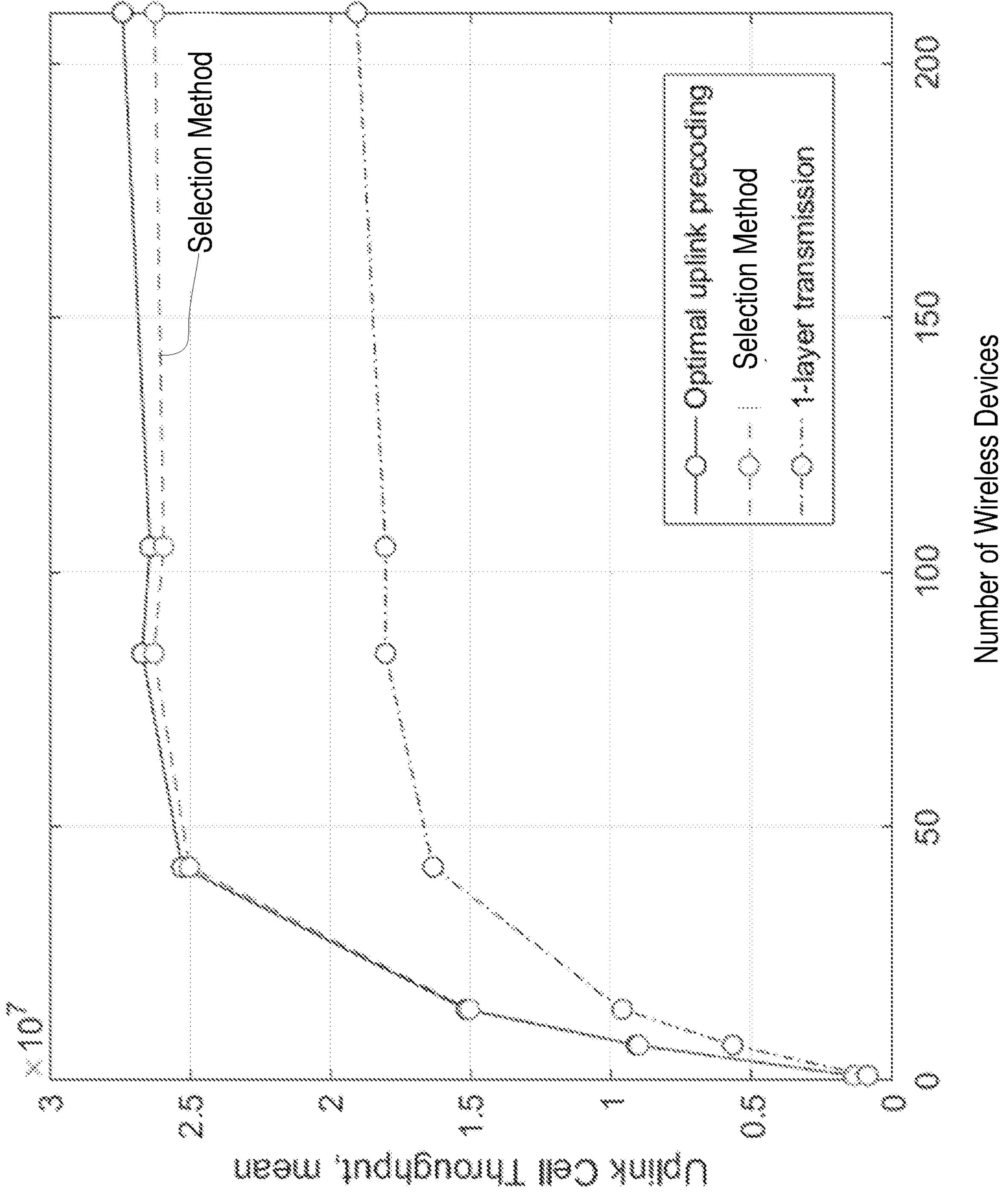
FIG. 10 is a diagram of average uplink cell throughput versus number of wireless devices in the simulation area.

FIG. 10 is a diagram illustrating the average uplink cell throughput versus the number of wireless devices 22 in the example simulation area. As illustrated in FIG. 10, the "selection method" described herein in accordance with the teachings of the instant disclosure yields a performance very close to that of the optimal precoding selection algorithm and that the performance loss due to exploration is less than 5%. Further, the "selection method" provides for adaptive rank selection while the 1-layer transmission method does not. The "selection method" results illustrated in FIG. 10 is based on the beampattern neighbors-based exploration set and reception quality-based exploitation mode duration selection, both of which are described herein.

Figure 11:
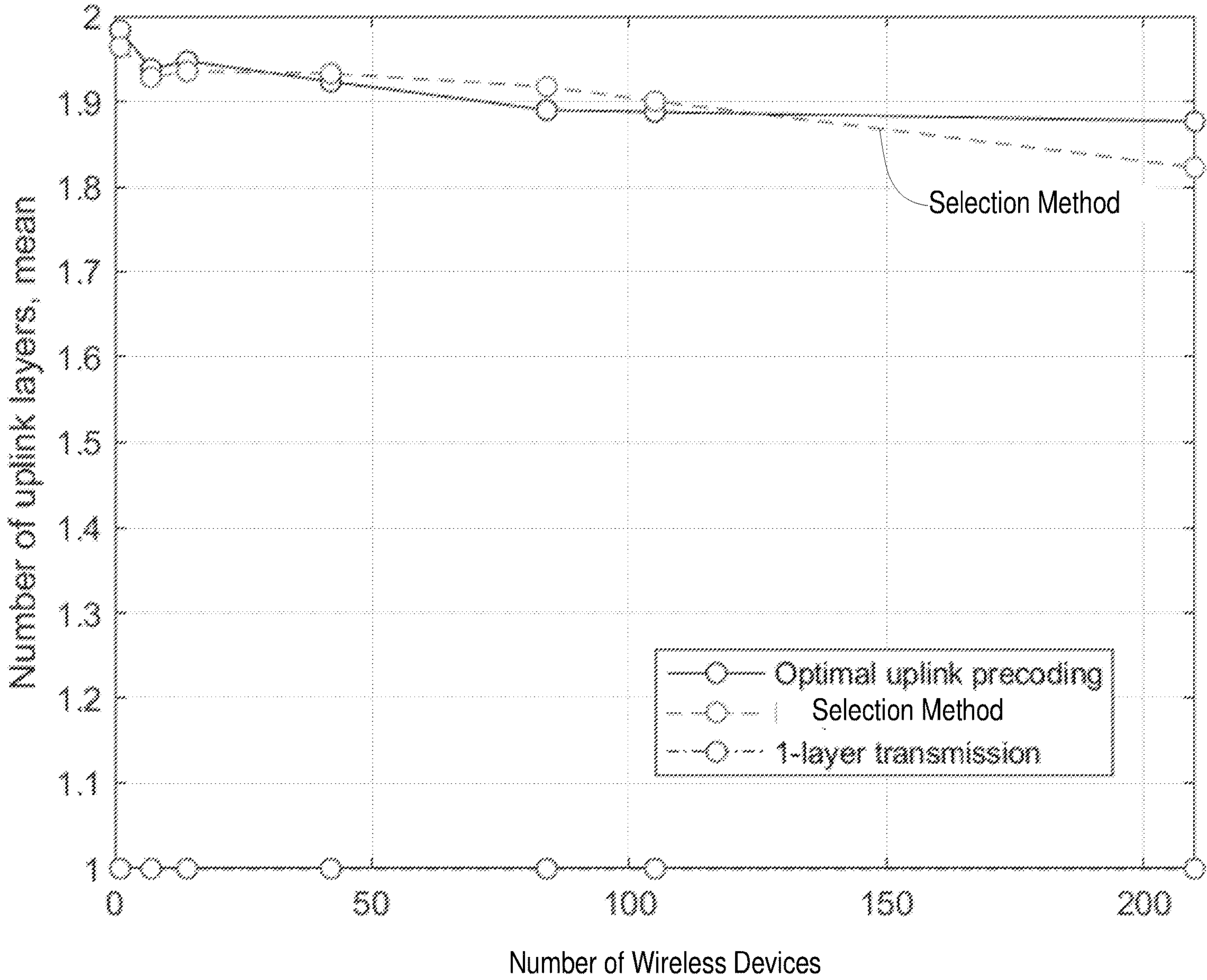
FIG. 11 is a diagram of an average number of uplink layers versus a number of wireless devices.
Figure 12:
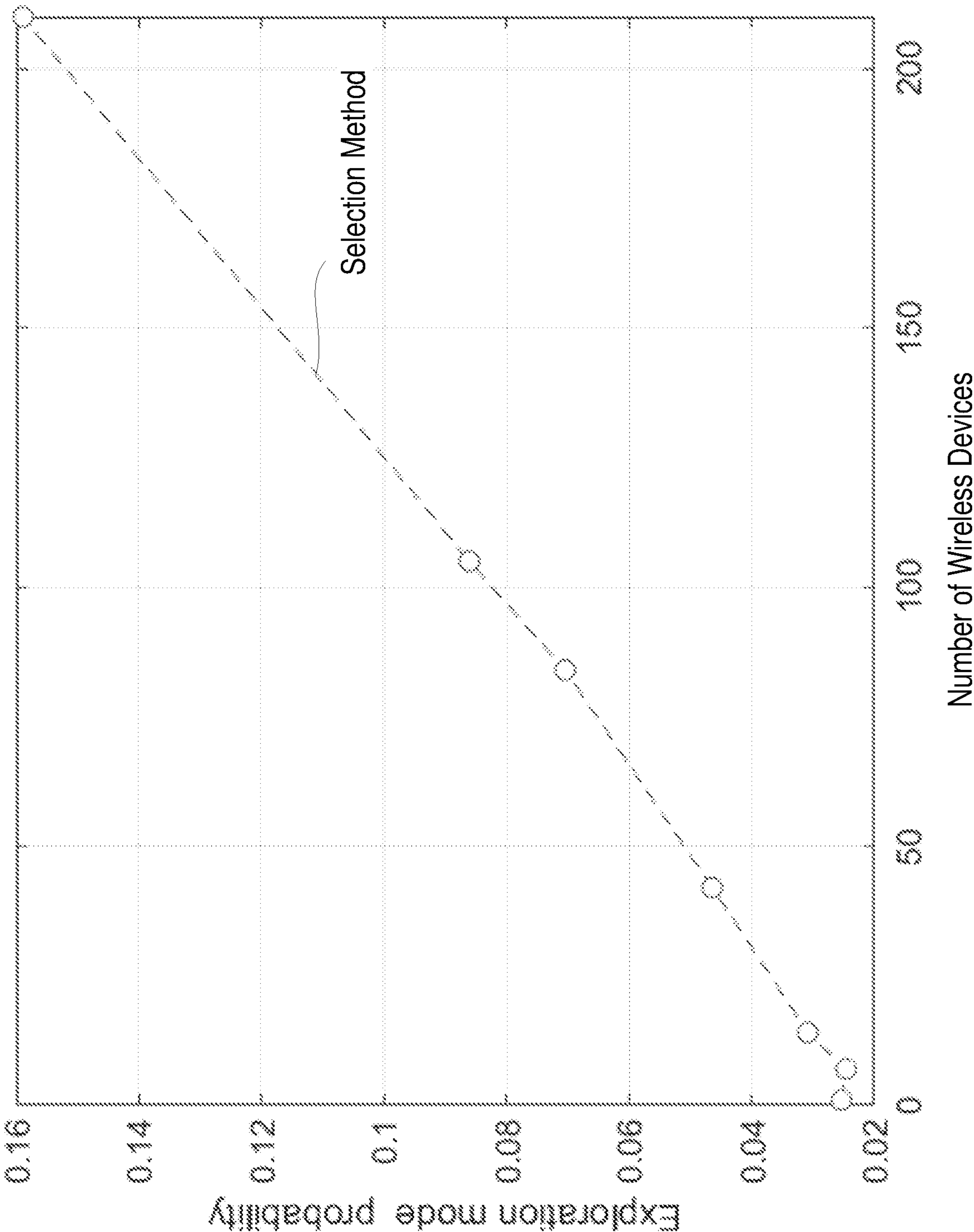
FIG. 12 is a diagram of an exploration mode probability versus number of wireless devices.

FIG. 11 is a diagram illustrating the average number of uplink layers versus the number of active wireless devices 22 in the example system. The "selection method" described herein yields a similar number of layers as that selected by the optimal precoding selection algorithm. FIG. 12 is a diagram illustrating the probability of being in exploration mode, i.e., the fraction of time in which the wireless device 22 performs exploration. When the system is loaded and the wireless devices 22 are not frequently scheduled in the uplink, the probability of being in exploration mode is very small (around 16% for the case of 10 simultaneously active wireless devices 22 per cell). Hence, the algorithm/processes described herein can efficiently switch between the two modes of operation and utilize the information acquired during exploration to select the optimal precoder during exploitation mode.

Therefore, the teachings described herein provide at least one or more of the following advantages:

- provides for adaptive selection of the number of spatial layers and precoding matrix for uplink transmission based, for example, only on the information provided from previous uplink receptions.
- provides for a very low computational complexity as processing or storage of uplink channel estimates or their statistics for selecting the number of uplink layers or uplink precoding are not required.
- provides for a robust algorithm/method/process that is robust against modeling and/or estimation errors in the uplink channel.
- provides performance that is close to optimal precoding selection algorithm according to simulation results while offering significant savings in computational complexity and memory requirements.

Some Examples

1. A system 10 and method for uplink SU-MIMO codebook-based precoding selection in wireless systems, e.g., LTE and NR. The system 10 and method can directly select the number of uplink layers and precoder by processing previous uplink receptions without explicitly estimating the uplink channel or its statistics.

2. A system 10 and method for switching the uplink precoding selection between exploration mode, where the objective is to collect information about favorable spatial multiplexing directions, and exploitation mode, where the objective is to utilize the information collected so far about the spatial multiplexing directions of the channel.

3. A method for generating the set of precoders to be used in exploring the spatial directions of the channel based on previous precoding selections based on beampattern.

4. An adaptive method for generating the set of precoders to be used in exploring the spatial directions that utilizes the reception quality metric of previous uplink transmissions from several exploration phases.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

AAS Adaptive Antenna System
ICC Information Carrying Capacity
LTE Long Term Evolution
MIMO Multiple Input Multiple Output
NLOS Non-Line of Sight
SINR Signal to Interference-plus-Noise Ratio
SU Single-User
UE User Equipment It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:

processing circuitry configured to:

cause transmission of signaling of one or more uplink grants indicating a first exploration set of precoders for a first plurality of uplink transmissions, each precoder of the first exploration set of precoders being associated with an uplink transmission of the first plurality of uplink transmissions;

determine a first plurality of reception quality metrics associated with the first plurality of uplink transmissions;

determine a first precoder of the first exploration set of precoders based at least in part on the first plurality of reception quality metrics;

select the first precoder of the first exploration set of precoders for uplink transmission based at least on the first precoder meeting a predefined exploitation selection criterion; and form a second exploration set of precoders to be associated with a second plurality of uplink transmissions based at least on the first precoder failing to meet the predefined exploitation selection criterion;

wherein each one of the first exploration set of precoders is one of equal in rank to a second precoder of the first exploration set of precoders and within one rank to the second precoder; and the second precoder corresponding to one of a previously selected precoder for uplink transmission during an exploitation phase and a precoder from a previous exploration set of precoders;

wherein the first precoder is configured to be implemented for uplink transmission for an exploitation phase time period;

wherein the exploitation phase time period is based on a reception quality metric performance loss associated with a previous exploration set of precoders.

2. The network node of claim 1, wherein each one of the first exploration set of precoders is one of: within a predefined beam direction range of a beam direction of a second precoder of the first exploration set of precoders and associated with a smaller beam direction difference from the second precoder than other precoders omitted from the first exploration set of precoders; and the second precoder corresponding to one of a previously selected precoder for uplink transmission during an exploitation phase and a precoder from a previous exploration set of precoders.

3. The network node of claim 1, wherein each one of the first exploration set of precoders is associated with a transition probability greater than a predefined threshold, the transition probability corresponding to a probability that a precoder will be selected for uplink transmission in a next exploitation phase.

4. The network node of claim 1, wherein the first exploration set of precoders are a subset of precoders available for the wireless device.

5. The network node of claim 1, wherein the predefined exploitation selection criterion is met if the first precoder corresponds to a previously selected precoder of the first exploration set of precoders that corresponds to a previous exploration set.

6. The network node of claim 1, wherein the processing circuitry is further configured to, based on the determined first precoder not meeting the predefined criterion:

cause transmission of signaling of a one or more uplink grants indicating the second exploration set of precoders for the second plurality of uplink transmissions, each precoder of the second exploration set of precoders being associated with a different uplink transmission of the second plurality of uplink transmissions;

determine a second plurality of reception quality metrics associated with the second plurality of uplink transmissions;

determine a third precoder of the second exploration set of precoders based at least in part on the second plurality of reception quality metrics; and select the third precoder of the second exploration set of precoders for uplink transmission based on the third precoder meeting the predefined exploitation selection criterion; and form a third exploration set of precoders to be associated with a third plurality of uplink transmissions based on the third precoder failing to meet the predefined exploitation selection criterion.

7. The network node of claim 1, wherein a reception quality metric corresponds to a measure of a potential to successfully receive and decode an uplink transmission.

8. The network node of claim 1, wherein each of the first plurality of reception quality metrics is a normalized information carrying capacity, ICC, metric.

9. A method implemented in a network node that is configured to communicate with a wireless device, the method comprising:

causing transmission of signaling of one or more uplink grants indicating a first exploration set of precoders for a first plurality of uplink transmissions, each precoder of the first exploration set of precoders being associated with an uplink transmission of the first plurality of uplink transmissions;

determining a first plurality of reception quality metrics associated with the first plurality of uplink transmissions;

determining a first precoder of the first exploration set of precoders based at least in part on the first plurality of reception quality metrics;

selecting the first precoder of the first exploration set of precoders for uplink transmission based at least on the first precoder meeting a predefined exploitation selection criterion; and forming a second exploration set of precoders to be associated with a second plurality of uplink transmissions based at least on the first precoder failing to meet the predefined exploitation selection criterion;

wherein each one of the first exploration set of precoders is one of equal in rank to a second precoder of the first exploration set of precoders and within one rank to the second precoder; and the second precoder corresponding to one of a previously selected precoder for uplink transmission during an exploitation phase and a precoder from a previous exploration set of precoders;

wherein the first precoder is configured to be implemented for uplink transmission for an exploitation phase time period;

wherein the exploitation phase time period is based on a reception quality metric performance loss associated with a previous exploration set of precoders.

10. The method of claim 9, wherein each one of the first exploration set of precoders is one of: within a predefined beam direction range of a beam direction of a second precoder of the first exploration set of precoders and associated with a smaller beam direction difference from the second precoder than other precoders omitted from the first exploration set of precoders; and the second precoder corresponding to one of a previously selected precoder for uplink transmission during an exploitation phase and a precoder from a previous exploration set of precoders.

11. The method of claim 9, wherein each one of the first exploration set of precoders is associated with a transition probability greater than a predefined threshold, the transition probability corresponding to a probability that a precoder will be selected for uplink transmission in a next exploitation phase.

12. The method of claim 9, wherein the first exploration set of precoders are a subset of precoders available for the wireless device.

13. The method of claim 9, wherein the predefined exploitation selection criterion is met if the first precoder corresponds to a previously selected precoder of the first exploration set of precoders that corresponds to a previous exploration set.

14. The method of claim 9, further comprising, based on the determined first precoder not meeting the predefined criterion:

causing transmission of signaling of a one or more uplink grants indicating the second exploration set of precoders for the second plurality of uplink transmissions, each precoder of the second exploration set of precoders being associated with a different uplink transmission of the second plurality of uplink transmissions;

determining a second plurality of reception quality metrics associated with the second plurality of uplink transmissions;

determining a third precoder of the second exploration set of precoders based at least in part on the second plurality of reception quality metrics;

selecting the third precoder of the second exploration set of precoders for uplink transmission based on the third precoder meeting the predefined exploitation selection criterion; and forming a third exploration set of precoders to be associated with a third plurality of uplink transmissions based on the third precoder failing to meet the predefined exploitation selection criterion.

15. The method of claim 9, wherein a reception quality metric corresponds to a measure of a potential to successfully receive and decode an uplink transmission.

16. The method of claim 9, wherein each of the first plurality of reception quality metrics is a normalized information carrying capacity, ICC, metric.

* * * * *